Figure 3:
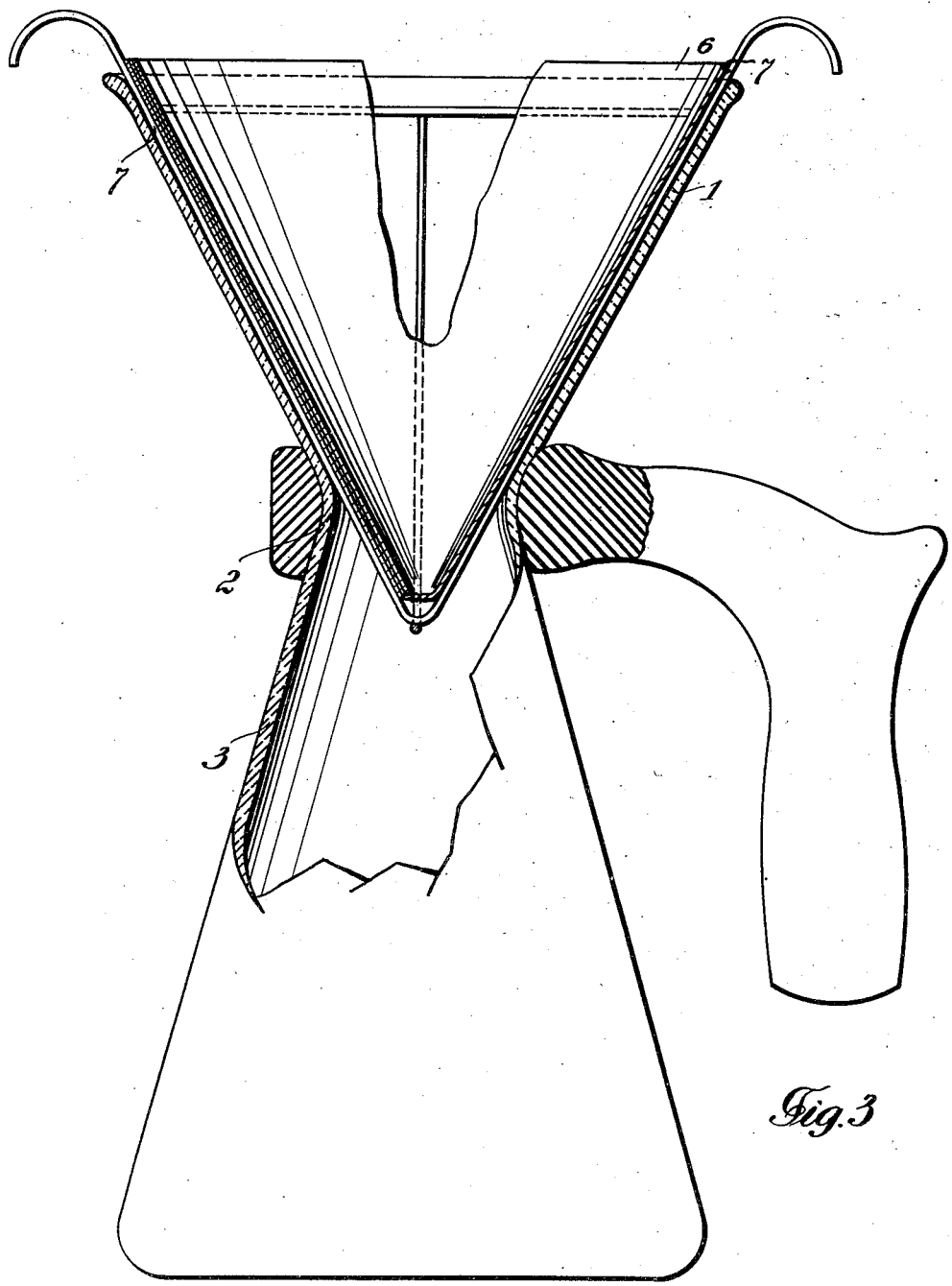

Oct. 10, 1944.   P. SCHLUMBOHM   2,359,943
FILTERING AND DECANTER DEVICE
Filed May 5, 1941   2 Sheets-Sheet 1
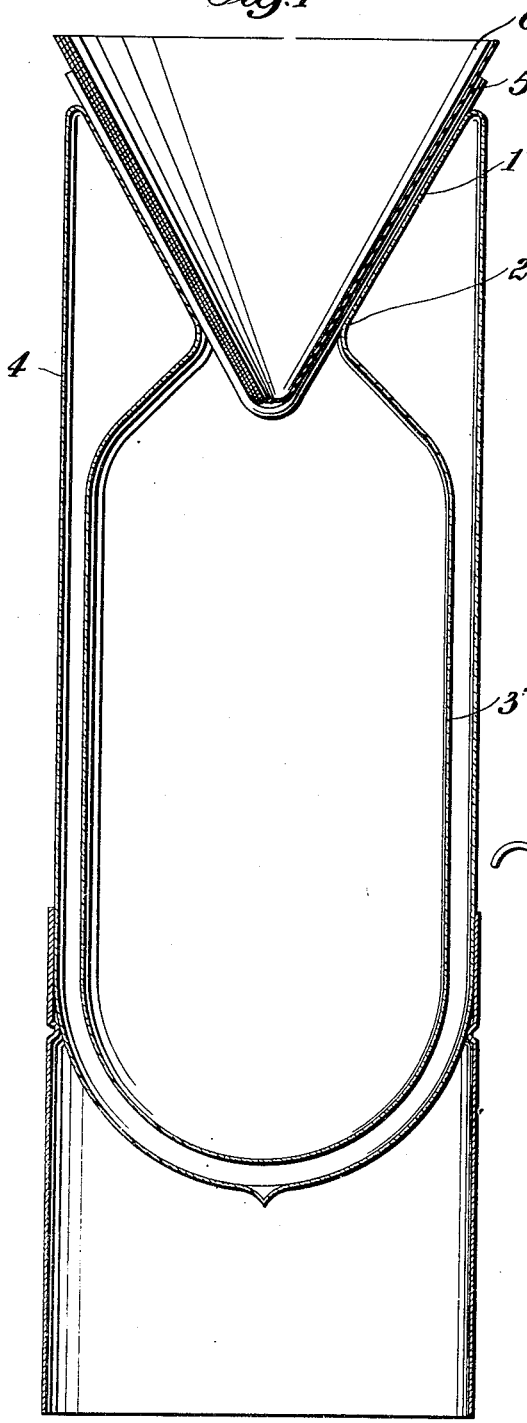
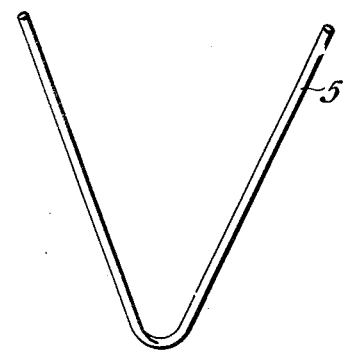
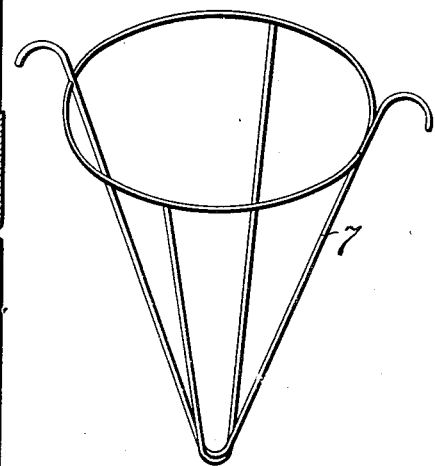
INVENTOR Patented Oct. 10, 1944

2,359,943

UNITED STATES PATENT OFFICE 2,359,943

FILTERING AND DECANTER DEVICE

Peter Schlumbohm, New York, N. Y., assignor of one-half to Isaac Harter, Akron, Ohio Application May 5, 1941, Serial No. 391,932

2 Claims. (Cl. 210—160)

The present application is a continuation in part of my copending patent application Ser. No. 267,561 which has now matured into Patent No. 2,241,368 granted May 6, 1941. The invention refers to a filtering device, which is also a decanter for the filtrate.

The invention is shown by way of examples in the accompanying drawings Fig. 1–Fig. 4, which are partly in vertical section and partly in view. Fig. 1 and Fig. 2 correspond to drawings of the parent application, while Fig. 3 and Fig. 4 disclose additional invention.

As described in the parent application, the device is characterized by a flask, with a neck, with a top part adjacent to said neck and with a top opening for filling in and for pouring out the liquid. The top part is shaped to form a filter-funnel to receive a filtering element, e. g. a cone of filter paper. The neck must be wide enough to allow simultaneously the passage of downward flowing filtrate and the passage of upward flowing escaping air. After having passed the neck, the air must find its way in the zone between the walls of the funnel and the filtering element to leave finally through the top opening into the atmosphere, and channels must be kept open in this zone for the escaping air. In the parent application I have shown the advantage of a groove in the wall of the funnel part for this purpose. In the present application I wish to emphasize the advantage of another type of "air-escape means," which is not integral with the structure of the flask, but which is removably inserted into the top-part.

Fig. 1 shows a flask 3' with its neck 2' and its funnel 1', built with an outer jacket 4 to form a vacuum-flask. A V-shaped wire 5, which is shown separately in Fig. 2, is removably inserted in the funnel 1'. The wire is inserted before the filter-cone 6 is inserted. I found that such a wire will keep channels open for the air which escapes from the neck 2' when displaced by filtrate in the flask.

Fig. 3 shows another flask 3, with its neck 2 and its funnel 1. A wire basket 7, which is shown separately in Fig. 4, is inserted between the funnel 1 and the filter-cone 6.

Already in the parent application I had pointed out that the advantage of such a type of air-escape means as shown in Fig. 1 and Fig. 2 is: first, the manufacturing advantage of shaping the funnel part without a groove, especially considering glass-blowing technique; second, the practical advantage of the V-shape, being e. g. a safeguard against falling into the flask and piercing the bottom.

In addition it was found, that such a wire, which embraces the filter-cone, is very useful and instrumental in lifting out the filter-cone with the coffee-ground or extracted tea-leaves after the filtration process is over. While the type of instrument as shown in Fig. 2 and in the parent application already serves this purpose, an instrument as shown in Fig. 4 amplifies this feature and is still more useful, as it embraces the filter-cone not only on two but on four sides.

I am aware that the Patent No. 1,434,905, which was cited by the Examiner in the case of the parent application, discloses the idea of inserting wire elements between the wall of a filter-funnel and the filter-cone. However, such "spacing devices" were conceived merely to facilitate the flow of filtrate. In the cited patent single wires are suspended from the edge of the funnel, and such construction could not serve the purpose of lifting the filter cone out of the funnel after the filtering operation.

As already stated in the parent application, the advantage of manufacturing the funnel without a groove is a simplification of the glass-blowing technique, especially if the device is built as a vacuum-flask. The example shown in Fig. 1 is a good construction, as the parts 1', 2' and 3' can be manufactured in one piece as the "inside blank," which is then sealed at its edge to the "outer blank" 4.

In the parent application I had also shown the possibility of utilizing tubular elements as spacer, instead of using wire. Profiled straps of metal could also be used, but of all possibilities, wire seems to be the simplest construction. This spacer element, as I may mention, is not designed to support the filter cone, while the filter is filled with the extracting liquid—this support being effected by the walls of the funnel 1, 1'—but is designed to support the "dry" filter filled with the extracted coffee ground to the effect of lifting the filter with the residue out of the funnel to throw it away.

The present invention still improves the simplicity and usefulness of a "one-piece" filtering- and decanter-device by allowing to manufacture it without groove or spout and by facilitating the removal of the residue, e. g. coffee ground.

Concerning the structural details, I wish to state that Fig. 3 is drawn to scale. The funnel walls have an angle of 60° to support snugly a filter cone, formed by folding over twice a filter paper with three layers on the one half as shown. The restriction at the neck 2 of the flask 3 must be wide enough to allow simultaneously the passage of liquid and air as mentioned above, and I prefer an inside diameter of 35 mm. This width allows the apex of the filter-cone to protrude freely into the lower compartment of the flask 3 and the hydrostatic pressure of the liquid above the apex is greater than the pressure of filtrate in the zone where the spacer element is placed. This arrangement of providing a lower resistance pressure cooperates with the arrangement of the spacers to effect an escape of the air.

I claim as my invention:

1. A filtering and decanter device comprising a filter pot having an upper compartment and a lower compartment, said upper compartment being adapted to support a filtering element and for serving as a pouring surface, said lower compartment being adapted to receive filtrate, whereby said device may be used as a decanter for filtrate, said upper compartment having an inner wall surface substantially corresponding to the shape of a frustrum of a cone, said lower compartment being closed and having no opening other than at its top adjacent the upper compartment, a non-rigid filtering element substantially in the shape of an inverted cone located within said upper compartment with its apex extending therethrough, said element being directly supported by contact with the inner wall surface of said upper compartment, means disposed between said inner wall surface and said element for spacing a portion of said element from said inner wall surface along an area extending generally upwardly from the bottom of said inner wall surface to form a vent to the atmosphere above said upper compartment for air displaced by filtrate passing through the bottom of said element to said lower compartment.

2. The structure recited in claim 1, said spacing means comprising a cradle-like structure for supporting said non-rigid filtering element prior to its being placed in said upper compartment and after it has been removed therefrom.

PETER SCHLUMBOHM.